United States Patent [19]

Reeve et al.

[11] 4,325,783
[45] Apr. 20, 1982

[54] BLEACHING PROCEDURE USING CHLORINE DIOXIDE AND CHLORINE SOLUTIONS

[75] Inventors: Douglas W. Reeve, Orton; W. Howard Rapson, Scarborough, both of Canada

[73] Assignee: Erco Industries Limited, Islington, Canada

[21] Appl. No.: 98,190

[22] Filed: Nov. 27, 1979

Related U.S. Application Data

[63] Continuation-in-part of Ser. No. 23,845, Mar. 26, 1979, abandoned.

[30] Foreign Application Priority Data

Mar. 30, 1978 [GB] United Kingdom ............... 12433/78

[51] Int. Cl.$^3$ ......................... C01B 11/02; D21C 9/14
[52] U.S. Cl. ..................................... 162/88; 423/478; 423/506
[58] Field of Search ....................... 162/88, 89, 29, 30, 162/60, 67; 8/108 A, 108 R; 423/478, 541, 504, 506, 552, 551

[56] References Cited

U.S. PATENT DOCUMENTS

Re. 28,884  6/1976  Juck et al. ............................. 162/66
2,166,330  7/1939  Vincent ................................. 162/67
2,741,536  4/1956  Stone .................................... 8/108
3,433,702  3/1969  Juck et al. ............................ 162/66
3,536,577  10/1970  Rapson et al. ....................... 162/67
3,802,958  4/1974  Croon et al. ......................... 162/89
3,864,456  2/1975  Winfield et al. .................... 423/478
4,039,372  8/1977  Reeve et al. ......................... 162/88
4,086,329  4/1978  Cowley et al. ..................... 423/478

FOREIGN PATENT DOCUMENTS 2421242  10/1979  France .
2017775  10/1979  United Kingdom .

Primary Examiner—Marc S. Alvo
Attorney, Agent, or Firm—Sim & McBurney

[57] ABSTRACT

The adverse effects of dissolved organic material in the aqueous phase of pulp suspensions during bleaching using mixtures of chlorine dioxide and chlorine are overcome by applying the chlorine dioxide and chlorine serially to the pulp in two steps without an intermediate wash. An aqueous solution of chlorine dioxide and chlorine in which the chlorine constitutes from about 6 to about 10% of the total available chlorine of the solution is used in the first step and chlorine is used in the second step. The aqueous solutions are formed by dissolving in water chlorine dioxide and chlorine formed in a chlorine dioxide generator.

12 Claims, 2 Drawing Figures

BLEACHING PROCEDURE USING CHLORINE DIOXIDE AND CHLORINE SOLUTIONS

REFERENCE TO RELATED APPLICATION

This application is a continuation-in-part of copending U.S. patent application Ser. No. 023,845 filed Mar. 26, 1979, now abandoned.

FIELD OF INVENTION

The present invention relates to the bleaching of cellulosic fibrous material, more particularly to the bleaching of wood pulp.

BACKGROUND TO THE INVENTION

In multistage pulp bleaching and purification processes wherein wood pulp is subjected to a plurality of bleaching and caustic extraction stages, typically using mixtures of chlorine dioxide and chlorine in the first bleaching stage, chlorine dioxide in subsequent bleaching stages and sodium hydroxide in the caustic extraction stages, and the pulp is washed intermediate each such bleaching and caustic extraction stage, the volume of effluents from the multistage bleaching process and the overall fresh water requirement are decreased by effecting countercurrent washing operations within the multistage process and by using effluents from the bleach plant to wash the unbleached pulp during to its passage from the digester to the bleach plant, preferably utilizing the procedure described in U.S. Pat. No. 4,039,372.

One unforeseen problem which arises when the latter operations are used is that, to achieve the same final pulp brightness, chemical consumption in the first bleaching stage is increased when compared with bleaching effected in the absence of such use of effluents from the bleach plant. The increase in chemical consumption has been found to result from the presence of dissolved organic material in the aqueous phase of the dilute pulp suspension. The dissolved organic material consumes some bleaching chemicals, thereby, increasing chemical consumption.

The term "dissolved organic material" as used herein refers to bleaching chemical-consuming organic material dissolved in the aqueous phase of the pulp suspension and is measured in terms of total organic carbon (TOC).

SUMMARY OF INVENTION

It has now surprisingly been found that improved first stage bleaching may be effected in the presence of such dissolved organic material by utilizing a serial addition of particular bleaching chemical solutions without intermediate washing between the separate bleaching chemical addition steps, to result thereby in a decreased chemical consumption as compared with the application of the bleaching chemicals all at one time in the bleaching stage.

In accordance with the present invention, there is provided a multi-step process, wherein a gaseous mixture of chlorine dioxide, chlorine and steam is formed using a specific procedure, an aqueous solution of chlorine dioxide and chlorine having a specific concentration range is formed from the gaseous mixture, and a cellulosic fibrous material pulp is bleached in an aqueous suspension thereof at a specific consistency and in the presence of a specific concentration of dissolved organic material using the aqueous solution, in a serial application with an aqueous chlorine solution without an intermediate washing step under specific conditions.

The present invention, therefore, utilizes a novel combination of very specific operating conditions to provide more efficient chemical usage in bleaching when dissolved organic material is present in the pulp suspension.

DESCRIPTION OF PREFERRED EMBODIMENT OF INVENTION

Figure 2:
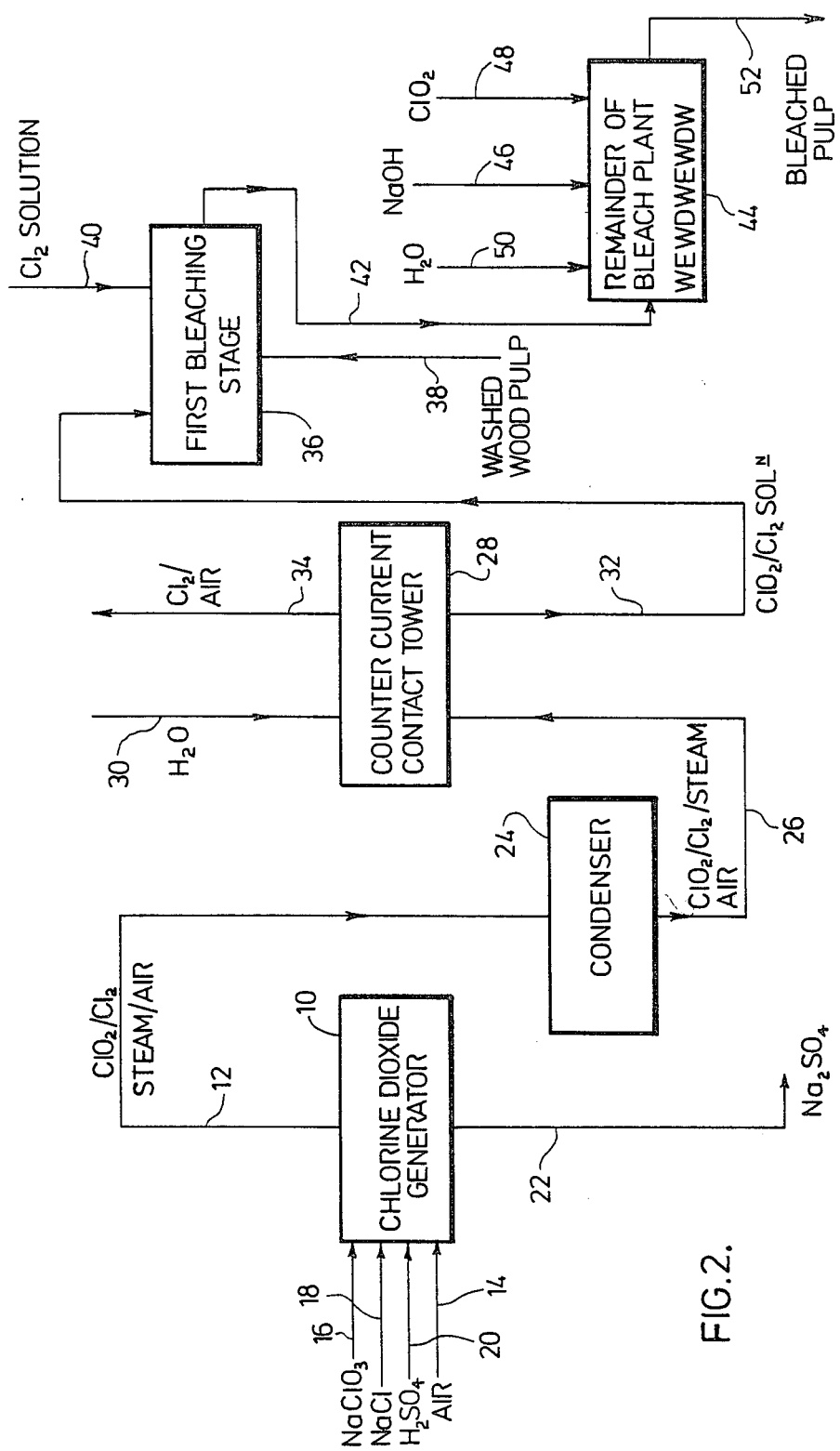
FIG. 2 is a flow sheet illustrating one embodiment of the invention.

Referring to FIG. 2 which is a flow sheet of the current best mode of effecting the invention known to the applicants, a chlorine dioxide generator 10 produces a gaseous product stream 12 containing chlorine dioxide, chlorine and steam.

The chlorine dioxide generator 10 has a unilocular reaction zone containing an aqueous acid reaction medium which is maintained at a temperature of about 55° to about 85° C. while a subatmospheric pressure of about 80 to about 300 mm Hg is applied to the reaction zone to maintain the same at its boiling point. An air bleed in line 14 is provided.

Reactants are continuously fed to the reaction medium in the form of sodium chlorate in line 16, sodium chloride in line 18 and sulphuric acid is fed by line 20. Hydrochloric acid may be used to replace all or part of the sodium chloride, in which case the hydrochloric acid also replaces part of the sulphuric acid. The feed of sulphuric acid maintains the total acid normality of the reaction medium in the range of about 2 to about 4.8 normal. Once saturation of the reaction medium is reached after start up, anhydrous neutral sodium sulphate precipitates from the reaction medium and is removed by line 22.

The reactions which occur in the chlorine dioxide generator 10 may be represented by the equations:

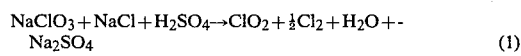
(1)

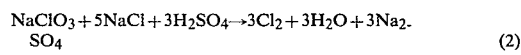
(2)

The reaction of equation (1) predominates in the process and the extent to which that reaction predominates constitutes the efficiency of the chlorine dioxide producing process.

The production of chlorine dioxide by the latter procedure has considerable benefits over prior chlorine dioxide-producing processes and these have lead to wide commercial practice of the process throughout the world. The process is known as the ERCO R3 (trademarks) process and is the subject of U.S. Pat. No. 3,864,456, assigned to the assignee of this application.

Although the invention is described with particular reference to the R3 process, the invention is applicable to and effective with other chlorine dioxide and chlorine producing processes wherein added chloride ion is used as the reducing agent for chlorate in the aqueous acid reaction medium while the reaction medium is maintained at its boiling point under a subatmospheric pressure, whereby the chlorine dioxide and chlorine is admixed with steam as the diluent gas therefor.

Examples of other chlorine dioxide and chlorine producing processes which may be used in place of the procedure of U.S. Pat. No. 3,864,456 are the ERCO R5 (trademarks) process, described in Canadian Pat. No. 913,328 and U.S. Pat. No. 4,075,308, and the ERCO R6 (trademarks) process, described in U.S. Pat. No. 3,929,974, wherein the sodium chlorate is reduced by hydrochloric acid, which provides all the chloride ions and all the hydrogen ions required for the process. The reactions involved are summarized by the following equations:

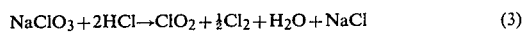

$$NaClO_3 + 2HCl \rightarrow ClO_2 + \tfrac{1}{2}Cl_2 + H_2O + NaCl \quad (3)$$

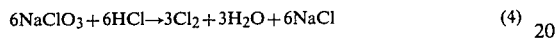

$$6NaClO_3 + 6HCl \rightarrow 3Cl_2 + 3H_2O + 6NaCl \quad (4)$$

wherein equations (3) and (4) correspond to equations (1) and (2) for the R3 process.

Another chlorine dioxide and chlorine producing process which may be utilized in the present invention is the ERCO R7 (trademarks) process, described in U.S. Pat. No. 4,086,329, wherein sulphuric acid and hydrochloric acid used in the reduction reaction are mainly regenerated internally by reaction of chlorine with sulphur dioxide and water.

The gaseous product stream in line 12 consisting of chlorine dioxide, chlorine, steam and a small amount of air is conveyed to a condensor 24 wherein the gas stream is cooled to a temperature of about 15° to about 55° C. (about 60° to about 130° F.) to cause partial condensation of the steam therein.

The gas stream in line 26 is fed into countercurrent contact in a contact tower 28 with a stream of chilled water in line 30 having a temperature of about 3° to about 10° C. (about 40° to about 50° F.) to dissolve all the chlorine dioxide from the gaseous stream along with part of the chlorine.

The aqueous solution of chlorine dioxide and chlorine leaving the tower 28 in line 32 usually has a concentration of chlorine dioxide of about 8 to about 9 grams per liter and a concentration of chlorine of about 1.5 to about 1.8 grams per liter, the actual concentrations being dependent on the temperature of the chilled water in line 30 and the flow rate of water to the tower 28. At the same flow rate, the concentrations of chlorine dioxide and chlorine increase with decreasing temperature, so that colder rather than warmer temperatures often are preferred.

The concentration of chlorine present in the aqueous solution of chlorine dioxide and chlorine in line 32 is always above 6.0% and up to 10.0% of the total available chlorine of that solution, preferably about 7 to 8%.

The term "total available chlorine" is used herein in its normal meaning in the bleaching art and refers to the total bleaching power of the solution, chlorine dioxide having a bleaching power which is 2.63 times that of chlorine on a weight basis.

Solutions of such concentrations contrast markedly with chlorine dioxide solutions obtained from other chlorine dioxide-producing processes. In those cases where no chloride ion is added and substantially pure chlorine dioxide is formed, the aqueous solution contains a negligible chlorine concentration. For those processes where chloride ion is added as the reducing agent and chlorine is produced along with the chlorine dioxide, such as, in the ERCO R2 (trademarks) process, which is the subject of U.S. Pat. No. 2,863,722, wherein air is used to dilute the gases, the chlorine dioxide solution produced by absorption in water contains some dissolved chlorine, but the concentration is well below the concentration thereof in the chlorine dioxide and chlorine solution present in line 32. Under typical operating conditions, the differences in partial pressure of the gases in the processes result in an aqueous solution of chlorine dioxide and chlorine containing 8 grams per liter chlorine dioxide and 1.7 grams per liter chlorine in the case of the R3 or similar process and an aqueous solution of chlorine dioxide and chlorine containing 8 grams per liter chlorine dioxide and 0.5 grams per liter chlorine in the case of the R2 process.

Such prior "technical chlorine dioxide solutions" may contain up to about 10% by weight of chlorine, corresponding to 4% on an available chlorine basis, although the applicants are aware that the literature refers to values as high as 5.7% on an available chlorine basis. The typical R2 process solution contains about 2.3% on an available chlorine basis.

The difference in chlorine concentrations between those provided by prior procedures and those resulting in this invention arises from the differences in partial pressure of chlorine dioxide and chlorine in the gaseous streams which are contacted by water in the absorption tower.

The gaseous product stream resulting from the contact tower 28 consists of chlorine and air in line 34. The vacuum in the generator 10 is usually applied via the gaseous stream in line 34, typically after dissolving the chlorine therefrom in a convenient aqueous medium. A vacuum pump of any desired type may be used to apply the vacuum, and the value of the subatmospheric pressure is controlled by the air bleed to the generator 10 in line 14.

Usually the chlorine dioxide generator 10 is provided with sufficient capacity that the chlorine dioxide and chlorine solution in line 32 is of sufficient volume for use in all bleaching operations requiring the use of chlorine dioxide. For convenience of illustration, the chlorine dioxide solution in line 32 is shown as being passed to the first stage 36 of a multistage bleaching and purification operation effected on a washed but otherwise untreated wood pulp in line 38, although it will be understood that usually only a proportion thereof passes to the first stage of the bleach plant.

The process of the present invention is applicable to any cellulosic fibrous material but is described with particular reference to the bleaching of wood pulp, preferably wood pulp produced by the Kraft process, i.e., wood pulp produced by digestion of wood chips in a pulping liquor containing sodium hydroxide and sodium sulphide as the active pulping chemicals.

The term "bleaching stage" as used herein refers to a pulp bleaching operation effected between other pulp treatments, usually washings. The term "bleaching step" as used herein refers to a pulp bleaching treatment effected within a bleaching stage.

In the first bleaching stage 36, the pulp suspension, of consistency of about 2 to about 16% by weight of pulp and containing dissolved organic material in an amount of about 2 to about 10% by weight TOC on pulp, is bleached by a serial application of the bleaching solutions. The pulp suspension is subjected to a first bleaching step with the chlorine dioxide and chlorine solution fed by line 32 at a temperature of about 35° to about 70° C., preferably about 50° to about 65° C. The first bleaching step may be effected at any desired acid pH value, usually at a pulp suspension pH of about 1 to about 6.

After a period of time of from about 5 seconds to about 10 minutes, usually about 30 seconds to about 5 minutes, has lapsed from the application of the aqueous solution of chlorine dioxide and chlorine, an aqueous chlorine solution fed by line 40 is applied to the pulp suspension. The chlorine solution in line 40 may be provided from any convenient source, for example, by absorbing the chlorine gas in line 34 in water. The chlorine treatment may be effected at any desired acid pH value, usually at a pulp suspension pH of about 0.7 to about 3. The bleaching procedure is allowed to proceed for about 10 to about 60 minutes at the bleaching temperature of about 35° to about 70° C.

The overall amount of available chlorine applied to the pulp in the first and second bleaching steps, both as chlorine dioxide and chlorine, usually is about 2 to about 10% by weight of the pulp. The chlorine dioxide in the aqueous solution of chlorine dioxide and chlorine constitutes about 20 to about 90%, preferably about 30 to about 75%, of the total available chlorine used in the first and second bleaching steps.

Following completion of the bleaching stage, the pulp passes by line 42 to the remainder of the multistage bleaching and caustic extraction operations 44, wherein the pulp is subjected to EDED steps using an aqueous solution of sodium hydroxide fed by line 46 in the E-stages, and an aqueous solution of chlorine dioxide fed by line 48 in the D-stages, usually part of the chlorine dioxide and chlorine solution in line 32. Intermediate washing is usually effected between each chemical application stage, using water fed by line 50. Other bleaching agents, such as, hypochlorite and peroxide may be used in the bleaching steps. The final bleached pulp is removed by line 52.

It is preferred to effect countercurrent flow of aqueous media with respect to pulp flow through the bleaching and purification operations, as discussed above. This operation results in the presence of about 3.5 to about 6.5% by weight TOC on pulp in the pulp suspension which is bleached in the first bleaching stage 36.

The bleaching and purification operations effected in 36 and 44 may be carried out by the so-called "dynamic bleaching" process, as described in Canadian Pat. No. 783,483, in which case the washing steps usually are omitted.

EXAMPLES

Example I

This Example illustrates the effect of the serial application of an aqueous solution of chlorine dioxide and chlorine followed by chlorine, when compared with the mixtures application of a solution of chlorine dioxide containing all the chlorine and the serial application of an aqueous solution of chlorine dioxide followed by chlorine.

A series of experiments was carried out on samples of a wood pulp having a Kappa number of 34.2, a K number of 23.4 and a viscosity of 28.8 cps with associated pulp mill filtrate. Bleaching was effected at 60° C. and 3.5% consistency for 30 minutes at an applied chlorine value of 7.6% by weight of pulp, with 70% of the available chlorine being provided by chlorine dioxide and 30% of the available chlorine being provided by chlorine.

In one set of experiments, the chlorine dioxide was applied as an aqueous solution and the chlorine was applied 1 minute after the chlorine dioxide application without an intermediate wash at varying % TOC levels in the filtrate.

In another set of experiments at varying % TOC levels in the filtrate, the chlorine dioxide was applied as an aqueous solution of chlorine dioxide containing part of the chlorine in an amount equivalent to 5% of the overall available chlorine, so that the chlorine provided about 7% of the available chlorine of the solution and was equivalent to a typical solution of chlorine dioxide and chlorine obtained from the ERCO R3 process, as described above. One minute following application of the chlorine dioxide and chlorine solution, the remainder of the chlorine (25% of the overall available chlorine) was applied without an intermediate wash.

In a further set of experiments, an aqueous solution of chlorine dioxide and chlorine again was applied, in this case containing chlorine in an amount equivalent to 10% of the overall available chlorine, so that the chlorine provided about 13% of the available chlorine of the chlorine dioxide and chlorine solution. The remainder of the chlorine (20% of the overall available chlorine) was applied 1 minute after the aqueous solution application without an intermediate wash.

In a yet further set of experiments, the bleaching was effected with an aqueous solution containing all the chlorine dioxide and all the chlorine.

For each set of experiments, the Kappa number of the pulp was determined after the pulp had been washed, alkali extracted using 3% NaOH on pulp for two hours at 70° C. and 12% consistency, and again washed. The Kappa number determinations were plotted against % TOC on pulp and the resulting graphical representations appear as FIG. 1. The dotted line labelled D/C and the dotted line labelled 0% are the trend lines for the results of the fourth and first sets of experiments respectively, the actual point determinations being omitted for ease of illustration. The symbol "→" signifies the serial application of bleaching chemicals without an intermediate wash.

Figure 1:
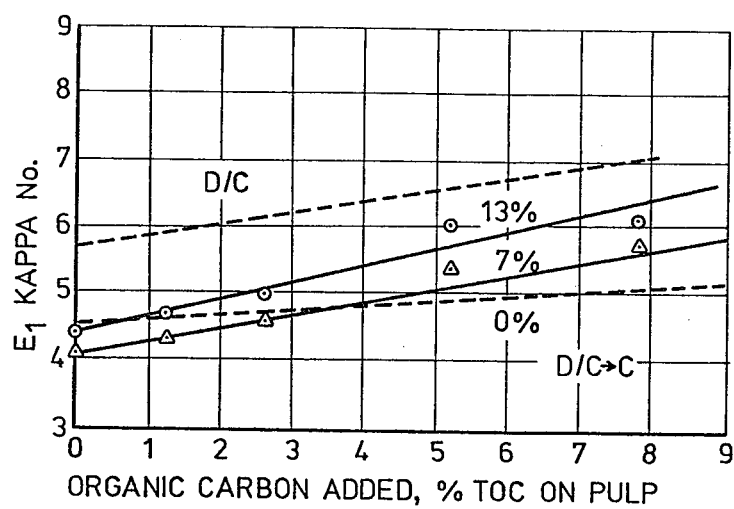
FIG. 1 is a graphical representation of the effect of various quantities of chlorine with chlorine dioxide, expressed as the percentage of total available chlorine in the chlorine dioxide and chlorine solution, in the first step of serial bleaching (D/C→C) in comparison with mixtures application (D/C)

As may be seen from FIG. 1, the results obtained at 7% available chlorine of the chlorine dioxide and chlorine solution provided by chlorine represent a considerable improvement over the results obtained using a single mixtures application and are not significantly different from the case where the initially-applied chlorine dioxide solution contains no chlorine.

The latter results are important in that they demonstrate that an aqueous chlorine dioxide and chlorine solution produced by the ERCO R3 process, may be used in the first step of the serial application to obtain results not significantly different from pure chlorine dioxide solution, without the necessity for purification by way of chlorine removal from the solution.

The results obtained at 13% of the available chlorine of the chlorine dioxide solution provided by chlorine represent an improvement over the results obtained using a single mixtures application but are more significantly different from the 0% case than the 7% case.

Example II

This Example illustrates the results attained at another proportion of $ClO_2$ to $Cl_2$ in the bleaching stage.

A softwood Kraft pulp, having a 20.8 K number, 30.9 Kappa number and a viscosity of 31.1 cps, was bleached at 60° C. and 3.5% consistency for 30 minutes at an applied equivalent $Cl_2$ value of 6.9% using 60% of the available chlorine as $ClO_2$ and 40% of the available chlorine as $Cl_2$, in the presence of dissolved organic material measuring 6.3% TOC on pulp.

After this bleaching step, the pulp was washed, caustic extracted using 2.8% NaOH on pulp at 12% consistency for 2 hours at 70° C., and then washed again. The pulp then was tested for its properties.

In one test, an aqueous solution of chlorine dioxide and chlorine containing all the chlorine dioxide, i.e., 60% of the available chlorine, and 4% $Cl_2$, as available chlorine (i.e., a solution in which the total available chlorine was provided approximately 93% $ClO_2$ and 7% $Cl_2$) was first applied to the pulp, followed 2½ minutes later without an intermediate wash by an aqueous solution of the remainder of the chlorine, i.e., 36% of the available chlorine.

In a second test, the same aqueous solution of chlorine dioxide and chlorine was used in the first application but in the second application, applied 2½ minutes after the first application without an intermediate wash, there was used an aqueous solution containing 36% available chlorine provided 4% by chlorine dioxide and 32% by chlorine.

In a third test, the chlorine dioxide was first added as an aqueous solution thereof 2½ minutes prior to the addition, without any intermediate washing, of the chlorine as an aqueous solution thereof.

In a fourth test, the chlorine dioxide and chlorine were added as an aqueous solution thereof containing all the $ClO_2$ and $Cl_2$.

The results obtained are outlined in the following Table:

TABLE

| Serial Bleach | | | | |
| --- | --- | --- | --- | --- |
| Step 1 D/C | Step 2 D/C | Kappa No. | K No. | Viscosity cps. |
| 60/4 | 0/36 | 5.23 | 4.05 | 26.8 |
| 60/4 | 4/32 | 5.75 | 4.44 | 26.7 |
| 60/0 | 0/40 | 5.68 | 4.44 | 26.3 |
| 60/40 | — | 7.73 | 5.87 | 26.3 |

The results of the above Table indicate the improvement in Kappa and K numbers achieved using the serial application of bleaching chemicals in the first bleaching stage as compared with mixtures, and the insignificant difference in pulp properties attained by the use of chlorine dioxide and limited quantities of chlorine in the first step, when compared with all chlorine dioxide in the first step of the serial chemicals application.

SUMMARY OF DISCLOSURE

In summary of this disclosure, the present invention is directed to a bleaching procedure which permits the adverse effects of the presence of dissolved organic carbon to be overcome and chemical usage economies to be effected. Modifications are possible within the scope of the invention.

What we claim is:

1. A method of bleaching pulp using chlorine dioxide, which comprises:
   (a) continuously forming a gaseous mixture of chlorine dioxide, chlorine and steam by:
      (i) continuously feeding a sodium chlorate solution to an aqueous acid reaction medium present in a unilocular reaction zone,
      (ii) continuously feeding sulphuric acid to said aqueous reaction medium in an amount to maintain the total acid normality of the reaction medium in the range of about 2 to about 4.8 normal,
      (iii) continuously feeding sodium chloride, hydrochloric acid or a mixture of sodium chloride and hydrochloric acid to said aqueous reaction medium,
      (iv) continuously maintaining said reaction medium at a temperature of about 55° to about 85° C. while maintaining said reaction zone under a subatmospheric pressure of about 80 to about 300 mm Hg to cause the formation of chlorine dioxide and chlorine and the evaporation of water from the reaction medium,
      (v) continuously depositing anhydrous neutral sodium sulphate from the reaction medium in said reaction medium in said reaction zone once the reaction medium becomes saturated thereby after start up, and
      (vi) continuously removing the gaseous mixture of chlorine dioxide, chlorine and steam from the reaction zone;
   (b) continuously cooling said gaseous stream to a temperature of about 15° to about 55° C. to cause condensation of at least a substantial proportion of the steam therefrom to provide a chlorine dioxide- and chlorine-containing gas stream;
   (c) continuously contacting the latter gas stream with water having a temperature of about 3° to about 10° C. at a flow rate sufficient to form an aqueous solution of chlorine dioxide and chlorine containing about 8 to about 9 grams per liter of chlorine dioxide and about 1.5 to about 1.8 grams per liter of chlorine, and a gaseous chlorine stream; and
   (d) bleaching a cellulosic fibrous material pulp for about 10 to about 60 minutes at a temperature of about 35° to about 70° C. in an aqueous suspension having a consistency of about 2 to about 16% by weight of pulp and containing dissolved organic material in an amount of about greater than 2 to about 10% by weight TOC on pulp at an overall equivalent chlorine concentration of about 2 to about 10% by weight of the pulp, by:
      (i) subjecting said suspension to a first bleaching step at an acid pH value using at least part of said aqueous solution of chlorine dioxide and chlorine formed in step (c), and
      (ii) without an intermediate washing step, subjecting the suspension to a second bleaching step at an acid pH using a chlorine solution and commencing about 5 seconds to about 10 minutes after commencement of said first bleaching step, the chlorine dioxide in said aqueous solution of chlorine dioxide and chlorine constituting about 20 to about 90% of the total available chlorine used in said first and second bleaching steps.

2. The method of claim 1 wherein said dissolved organic material content of said suspension is about 3.5 to about 6.5% by weight TOC on pulp.

3. The method of claim 1 wherein said cellulosic fibrous material is wood.

4. The method of claim 1 wherein said first and second bleaching steps are effected at a temperature of about 50° to about 65° C. and the second bleaching step is commenced about 30 seconds to about 5 minutes after commencement of the first bleaching step.

5. The method of claim 1 wherein said chlorine dioxide in said aqueous solution of chlorine dioxide and chlorine constitutes about 30 to about 75% of the total available chlorine used in said first and second bleaching steps.

6. The method of claim 1 wherein said pulp suspension has a pH of about 1 to about 6 in said first bleaching step and a pH of about 0.7 to about 3 in said second bleaching step.

7. The method of claim 1 wherein:
(a) said cellulosic fibrous material is wood;
(b) said first and second bleaching steps are effected at a temperature of about 50° to about 65° C.;
(c) said second bleaching step is commenced about 30 seconds to about 5 minutes after commencement of the first bleaching step;
(d) said first bleaching step is effected at a pulp suspension pH of about 1 to about 6;
(e) said second bleaching step is effected at a pulp suspension pH of about 0.7 to about 3; and
(f) said chlorine dioxide in said aqueous solution of chlorine dioxide and chlorine constitutes about 30 to about 75% of the total available chlorine used in said first and second bleaching steps.

8. The method of claim 7 wherein said dissolved organic material content of said suspension is about 3.5 to about 6.5% by weight TOC on pulp.

9. A method of bleaching pulp using chlorine dioxide, which comprises:
(a) continuously forming a gaseous mixture of chlorine dioxide, chlorine and steam by:
(i) continuously feeding a sodium chlorate solution to an aqueous acid reaction medium present in a unilocular reaction zone,
(ii) continuously feeding sulphuric acid to said aqueous reaction medium in an amount to maintain the total acid normality of the reaction medium in the range of about 2 to about 4.8 normal,
(iii) continuously feeding sodium chloride, hydrochloric acid or a mixture of sodium chloride and hydrochloric acid to said aqueous reaction medium,
(iv) continuously maintaining said reaction medium at a temperature of about 55° to about 85° C. while maintaining said reaction zone under a subatmospheric pressure of about 80 to about 300 mm Hg to cause the formation of chlorine dioxide and chlorine and the evaporation of water from the reaction medium,
(v) continuously depositing anhydrous neutral sodium sulphate from the reaction medium in said reaction zone once the reaction medium becomes saturated thereby after start up, and
(vi) continuously removing the gaseous mixture of chlorine dioxide, chlorine and steam from the reaction zone;

(b) continuously cooling said gaseous stream to a temperature of about 15° to about 55° C. to cause condensation of at least a substantial proportion of the steam therefrom to provide a chlorine dioxide- and chlorine-containing gas stream;
(c) continuously contacting the latter gas stream with water having a temperature of about 3° to about 10° C. at a flow rate sufficient to form an aqueous solution of chlorine dioxide and chlorine containing chlorine in an amount of 6 to 10% of the available chlorine of that solution, and a gaseous chlorine stream; and
(d) bleaching a cellulosic fibrous material pulp for about 10 to about 60 minutes at a temperature of about 35° C. to about 70° C. in an aqueous suspension having a consistency of about greater than 2 to about 10% by weight of pulp and containing dissolved organic material in an amount of about 2 to about 10% by weight TOC on pulp at an overall equivalent chlorine concentration of about 2 to about 10% by weight of the pulp, by:
(i) subjecting said suspension to a first bleaching step at an acid pH value using at least part of said aqueous solution of chlorine dioxide and chlorine formed in step (c), and
(ii) without an intermediate washing step, subjecting the suspension to a second bleaching step at an acid pH using a chlorine solution and commencing about 5 seconds to about 10 minutes after commencement of said first bleaching step, the chlorine dioxide in said aqueous solution of chlorine dioxide and chlorine constituting about 20 to about 90% of the total available chlorine used in said first and second bleaching steps.

10. The method of claim 9 wherein:
(a) said cellulosic fibrous material is wood;
(b) said pulp suspension has a consistency of about 2 to about 16% by weight of pulp;
(c) said first and second bleaching steps are effected at a temperature of about 50° to about 65° C.;
(d) said second bleaching step is commenced about 30 seconds to about 5 minutes after commencement of said first bleaching step;
(e) said chlorine dioxide in said aqueous solution of chlorine dioxide and chlorine constitutes about 30 to about 75% of the total available chlorine used in said first and second bleaching steps.

11. The method of claim 10, wherein:
(a) said dissolved organic material content of said suspension is about 3.5 to about 6.5% by weight TOC on pulp;
(b) said first bleaching step is effected at a pulp suspension pH of about 1 to about 6; and
(c) said second bleaching step is effected at a pulp suspension pH of about 0.7 to about 3.

12. The method of claim 9, 10 or 11, wherein said aqueous solution of chlorine dioxide and chlorine contains chlorine in an amount of about 7 to 8% of the total available chlorine of the solution.

* * * * *